Dec. 26, 1950  R. G. LE TOURNEAU  2,535,301
AUXILIARY FUEL TANK FOR TRACTOR-IMPLEMENT COMBINATION
Filed Nov. 19, 1948
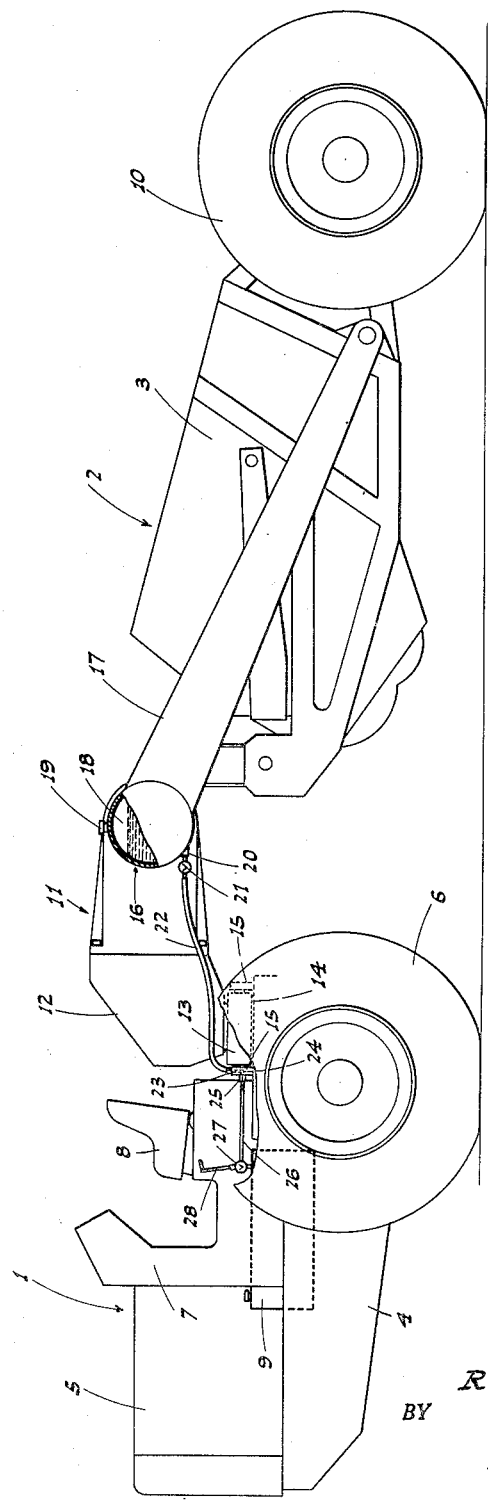
INVENTOR.
R. G. LeTourneau
BY
ATTYS Patented Dec. 26, 1950

2,535,301

UNITED STATES PATENT OFFICE 2,535,301

AUXILIARY FUEL TANK FOR TRACTOR-IMPLEMENT COMBINATION

Robert G. Le Tourneau, Longview, Tex., assignor to R. G. Le Tourneau, Inc., Stockton, Calif., a corporation of California Application November 19, 1948, Serial No. 60,898

3 Claims. (Cl. 280—5)

This invention relates in general to the fuel tank and fuel supply system for a tractor-implement combination.

The primary object of the invention is to increase the fuel capacity, and consequently the running time without refueling, of the tractor-implement combination by the inclusion, on the implement, of an auxiliary fuel tank connected by a valved conduit system to the main fuel tank on the tractor.

Another object of the invention is to provide an auxiliary fuel tank, as above, which is formed from one of the structural members of the implement; and at a point above the main gas tank on the tractor so that the fuel flow between the tanks is by gravity.

A further object of the invention is to provide a novel conduit system between the auxiliary fuel tank on the implement and the main fuel tank on the tractor; such conduit system being arranged so that turning of the tractor relative to the implement does not disturb said system.

An additional object of the invention is to provide an auxiliary fuel tank and valved conduit system, for the purpose described, which includes a valve control member accessible to the tractor driver, so that fuel flow between the tanks may be accomplished by the driver from his seat on said tractor.

A further object of the invention is to provide a practical and efficient auxiliary fuel tank for tractor-implement combinations, and one which will be exceedingly effective for the purpose for which it is designed.

These objects are accomplished by means of such structure and relative arrangement of parts as will fully appear by a perusal of the following specification and claims.

The figure of the drawing is a side elevation of a tractor-implement combination embodying the present invention; the view being partly broken away and partly in section to illustrate certain features.

Referring now more particularly to the characters of reference on the drawings, the invention is here illustrated in a combination which includes a two-wheel tractor, indicated generally at 1, and an implement, indicated generally at 2, which is in the form of an earth working scraper 3.

The tractor 1 is of two-wheel type and includes a forwardly projecting frame 4 which supports an engine (not shown) within a hood 5; such tractor being supported by transversely spaced, pneumatic tire wheels 6. Intermediate its ends the tractor includes an upstanding cockpit 7, to the rear of which is mounted the operator's seat 8.

Below the cockpit 7 the tractor 1 includes the main fuel tank 9 suitably mounted in connection with the frame structure of the tractor.

The scraper 3, which is here the trailing implement, includes transversely spaced, pneumatic tire wheels 10, and such scraper is supported, in draft relation from the tractor, by means of a draft yoke, indicated generally at 11, connected centrally at the front to the tractor at the rear by means of a coupling and power steering unit 12. Said coupling and power steering unit 12 includes a longitudinal trunnion 13 journaled for rotation, about a longitudinal axis, in connection with the deck 14 of the tractor by means including spaced trunnion blocks 15.

The draft yoke 11 includes a front tubular cross beam 16, and—at opposite ends—rearwardly and downwardly inclined draft beams 17 which connect to opposite sides of the scraper.

The tubular cross beam 16 is formed as an auxiliary fuel tank 18, which tank includes a filler neck 19 at the top and an outlet fitting 20 at the bottom. The outlet fitting 20 is connected to a normally open, manually controlled valve 21, which in turn feeds to a flexible hose 22. The flexible hose 22 extends alongside the coupling and power steering unit 12, and at its forward end said hose 22 is attached by a fitting 23 to the foremost one of the trunnion blocks 15.

Such foremost trunnion block 15 has a passage 24 bored therein, and the fitting 23 communicates with one end of such passage. Another fitting 25 is connected to the foremost trunnion block 15 in communication with the opposite end of the passage 24; such fitting 25 being on one end of a conduit 26 which leads forwardly to the main fuel tank 9.

The conduit 26 has a normally closed valve 27 therein, and a valve control handle 28 upstands from said valve 27 within easy reach of the seat 8 for the tractor driver.

When the tractor-implement combination is in use, the tractor 1 is operated on fuel from the main fuel tank 9 until the supply in the latter is relatively low, as evidenced by the usual fuel gauge. At this time the driver from the seat 8 manipulates the valve control handle 28 to open the valve 27, whereupon fuel from the auxiliary tank 18 flows by gravity through the described conduit system into the main fuel tank 9.

When the latter is substantially full the valve 27 is closed.

It will be evident from the above that the transfer of fuel between the auxiliary fuel tank and the main fuel tank can be accomplished by the driver without leaving the seat 8.

The arrangement is such that the running time of the tractor without refueling from a separate source is greatly increased; there being fewer stops to refuel and consequently less lost time.

As the auxiliary fuel tank 18 is in a plane above the main fuel tank 9, the conduit system can be wholly gravitational; thus permitting of the use of a simplified arrangement.

The valve 21, which is normally open, is provided for the purpose of use when the coupling and power steering unit 12 is disconnected for separating the tractor 1 and implement 2.

When such separation is to be undertaken the valve 21 is first closed and then the flexible hose 22 is detached at one end or the other.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An auxiliary fuel tank assembly for an implement which includes a pulling tractor and a pulled vehicle which vehicle includes a draft yoke coupled to the tractor in steerable relation; such auxiliary fuel tank assembly consisting of a tubular cross beam incorporated as an integral part of the draft yoke, a fuel inlet means connected with the tubular cross beam at the top and a valved fuel outlet means connected with the tubular cross beam at the bottom, and valve controlled conduit means interposed between said valved outlet and the primary fuel tank on the tractor.

2. A structure as in claim 1 in which the tubular cross beam lies in a horizontal plane higher than the horizontal plane in which the primary tank lies whereby fuel may be permitted to flow by gravity from said auxiliary fuel tank to said primary fuel tank.

3. A structure as in claim 1 in which said conduit means includes a flexible tube connected at one end to said valved outlet, a non-flexible tube on the tractor connected with the primary fuel tank, the other end of the flexible tube being connected with the tube on the tractor, a valve interposed in said latter tube, and an operating handle for said last named valve, such handle extending to a point adjacent the driver's seat on the tractor.

ROBERT G. LE TOURNEAU.

REFERENCES CITED

The following references are of record in the file of this patent:

UNITED STATES PATENTS

| Number | Name | Date |
|---|---|---|
| 1,045,992 | Linn | Dec. 3, 1912 |
| 1,156,203 | Bartholomew | Oct. 21, 1915 |
| 2,111,563 | Kliesrath | Mar. 22, 1938 |
| 2,122,656 | Paget | July 5, 1938 |
| 2,354,438 | Craig | July 25, 1944 |
| 2,376,336 | Brown | May 22, 1945 |